(No Model.)
M. LOGSDON & G. BRAUNS, Jr.
HUB ATTACHING DEVICE.
No. 464,977. Patented Dec. 15, 1891.
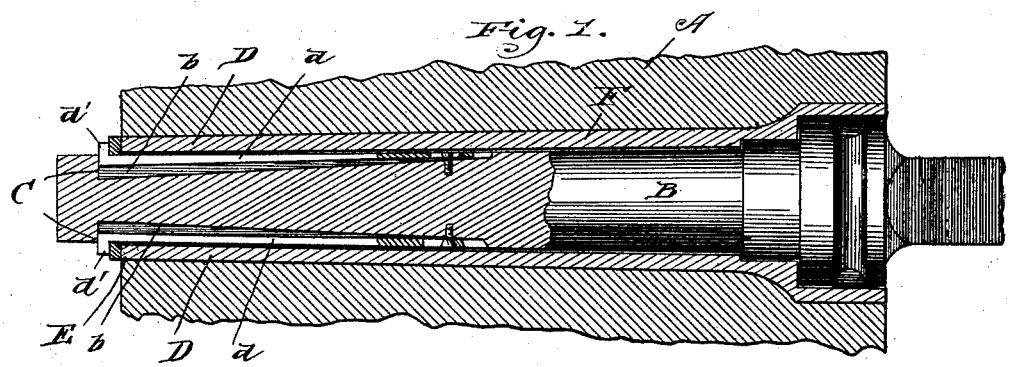
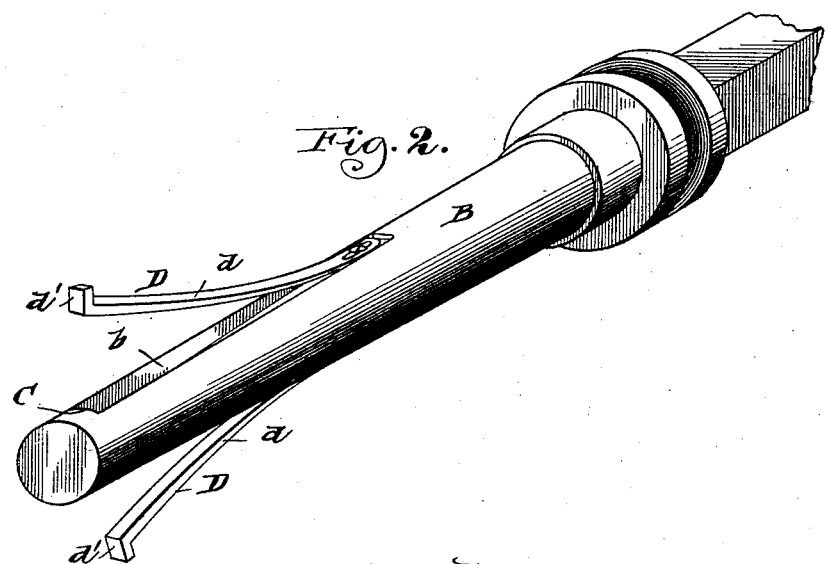
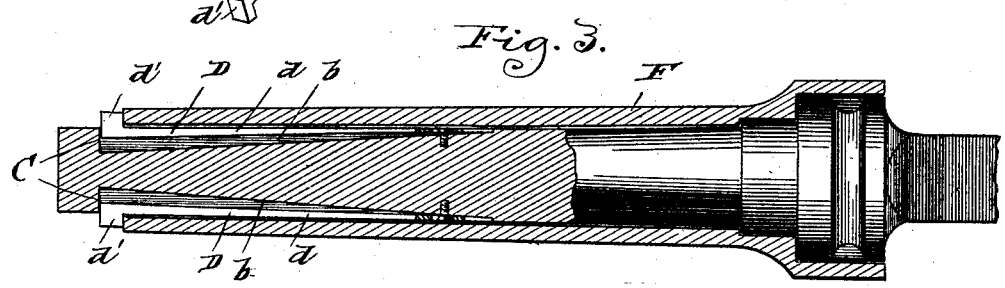
Witnesses,
Inventors
Matthew Logsdon
George Brauns Jr
By Chas. G. Page Atty.

UNITED STATES PATENT OFFICE.

MATTHEW LOGSDON AND GEORGE BRAUNS, JR., OF KOKOMO, INDIANA.

HUB-ATTACHING DEVICE.

SPECIFICATION forming part of Letters Patent No. 464,977, dated December 15, 1891.

Application filed December 15, 1890. Serial No. 374,707. (No model.)

*To all whom it may concern:*

Be it known that we, MATTHEW LOGSDON and GEORGE BRAUNS, Jr., both citizens of the United States, residing at Kokomo, in the county of Howard and State of Indiana, have invented a certain new and useful Improvement in Hub-Attaching Devices, of which the following is a specification.

The objects of our invention are to provide simple, reliable, durable, and efficient means for attaching wheel-hubs to axles, to dispense with the use of nuts, to avoid weakening the axle, to securely retain the wheel-hub in place and at the same time permit it to turn freely, to permit the wheel to be readily placed upon and removed from the axle, and to provide certain novel and improved details, all serving to increase the general utility and efficiency of hub-attaching devices.

To the attainment of the foregoing and other useful ends our invention consists in matters hereinafter set forth, and particularly pointed out in the claims.

In carrying out our invention we provide the axle with one or more, but preferably with a couple, of spring-stops, which can be forced inwardly or toward the longitudinal center of the axle during the act of slipping the wheel thereon. In connection with these spring-stops we provide the axle with a shoulder, which is arranged to form a backing or abutment for the spring-stops and which ultimately receives any and all end-thrust of the wheel-hub in a direction toward the end of the axle. The shoulder is arranged so that the hub can readily slip over it; but when the hub is in place the spring-stop automatically spring into place between an annular shoulder on the hub and the shoulder on the axle, the stops in such case being projected laterally from the axle to such extent that, while they shall in part lie against the axle-shoulder, their outer end portions will stand somewhat higher than said axle-shoulder, so as to engage either the annular shoulder on the hub or a washer which can be placed between the same and the spring-stops.

Certain matters of detail constituting further matters of improvement are hereinafter set forth.

In the accompanying drawings, Figure 1 is a section taken longitudinally through a wheel-hub and an end portion of an axle with our invention applied. Fig. 2 represents the axle detached. Fig. 3 is a view similar to Fig. 1 with the washer omitted.

In said drawings, A indicates the wheel-hub, and B denotes one of the end portions of an axle, which is understood to be also provided at its opposite end with our herein-described improved hub-attaching device. The axle is provided at its end with one or more shoulders or abutments C, which are preferably made integral with the axle.

The locking-springs D are formed by spring-strips $d$, each provided at its outer free end with a laterally-arranged lug or catch $d'$. The springs are applied to the axle so that their aforesaid catch ends shall lie opposite and contiguous to the shoulders C upon the axle, in which way said shoulders, conveniently considered as a whole, are adapted to form an abutment for backing the catch ends of the springs against shocks and strains incident to any and all end-thrusts of the wheel-hub in a direction toward the end of the axle. The axle is provided with longitudinally-arranged grooves $b$, which are formed in its perimeter and made of sufficient depth to receive the spring-strips $d$, in which way the spring-strips can be caused to lie just within the perimeter of the axle, and thereby out of contact with the base of the wheel-hub. The spring-strips are at or near their inner ends attached to the axle and are formed so that when the axle is free from the hub their free end portions will normally stand out from the axle, as in Fig. 2. When, however, the hub is in place, the spring-strips will be closed within their allotted grooves in the axle and their catch ends will lie opposite the outer end of the hub at points between said end of the hub and the shoulders C.

In order to permit the free ends of the springs to be forced inwardly—that is to say, toward the center of the axle—to an extent to allow the wheel-hub to slip over the lugs or catches $d'$ when it is desired to either place the hub upon the axle or remove it therefrom, the grooves $b$, which receive the springs, are at their outer end portions deepened toward the end of the axle. By this arrangement the free ends of the springs can be forced within the axle without injury to the springs, it being observed that by gradually deepening the grooves, as herein shown, an abrupt bending of the springs can be avoided, and as a convenient arrangement the shoulders C are formed by the outer ends of the said grooves. As a preferred arrangement we so arrange the springs with relation to the hub that a washer E can be placed between the lugs or catches on the free ends of the springs and the outer end of the wheel-hub.

In applying the wheel-hub to the axle it can be slipped upon the latter so as to bring it into the position illustrated in Fig. 1, it being understood that in thus putting on the hub the catch ends of the springs will be forced inwardly. In like manner the washer can be passed over the free ends of the springs so as to place it upon the axle at a point between the outer end of the hub and the catch ends of the springs, it being understood that, while the catch ends of the springs will be forced into the deepest portions of the grooves $d$ during the act of thus applying the washer, they will spring out as soon as the washer has cleared them and normally lie as stops between said washer E and the shoulder C.

By the foregoing arrangement any end-thrust of the hub will be transmitted to the shoulder C through the medium of the washer and the lugs or catches on the springs, and in this way accidental breakage on the part of the said lugs or catches will be avoided. The washer E will, in addition to its function as a washer between the hub and catch ends of the springs, also so hold the springs within the grooved portions of the axle as to prevent any undesirable frictional contact between the springs and the wall of the base of the hub, it being seen that the washer may either hold the springs entirely free from contact with the hub or so hold them that the frictional contact between the two will be no greater than the frictional contact between the hub and the ungrooved cylindric portions of the axle.

The hub is herein shown provided with a metal bushing F, and with such arrangement the washer can lie between the outer end of such bushing and the catches on the free ends of the springs.

As a matter of further improvement the springs are attached to the axle so that they may have a limited extent of end-play, it being observed that the hub is practically held upon the axle by the shoulder C and that the free ends of the springs form stops or wedges, which normally lie between the hub and shoulder and project laterally from the axle to a greater extent than said shoulder. The end-play of the springs insures the abutment of their catch ends against the shoulder C, and also permits them to automatically adjust themselves in case of wear. When the catch ends of the springs thus abut against the shoulders C, the practical effect is a lateral extension of the shoulder to an extent sufficient to prevent the washer and hub from slipping off or shifting along the axle.

We prefer forming the shoulder C integral with the axle, so as to avoid any possibility of its accidental detachment therefrom, and also so as to avoid the objectionable expense incident to forming it separate from the axle and providing means for securing it thereon—such, for example, as screw-threads. We may, however, for the broader purpose of our invention form the shoulder by a screw-ring made separate from the axle and screw or otherwise secure it upon a reduced threaded end of the axle, and in such case we may, in place of arranging the springs to have an end play or adjustment, rely upon the adjustment of the shoulder as a means for taking up wear and maintaining the shoulder in position to form an abutment for the catch ends of the springs. We may also omit the washer and arrange the springs and shoulders so that the lugs on the springs or spring-stops shall normally lie against the outer end of the hub and the shoulder on the axle, as shown in Fig. 3; but we prefer employing the washer for purposes hereinbefore set forth.

What we claim as our invention is—

1. A hub-attaching device comprising a shoulder upon the axle and one or more spring stops or catches arranged to normally lie between said shoulder and the wheel-hub when the latter is in place upon the axle, substantially as set forth.

2. The combination, with the axle provided with a shoulder, of springs attached to the axle and provided with lugs arranged to abut against said shoulder, substantially as and for the purpose set forth.

3. The combination, substantially as hereinbefore set forth, of the axle provided with a shoulder, spring-stops arranged alongside said shoulder, and a washer arranged to lie between the spring-stops and the end of a wheel-hub upon the axle.

4. The combination, substantially as hereinbefore set forth, of the axle provided with a shoulder C, and springs D, applied to the axle so as to have an end movement, for the purpose described.

5. The combination, substantially as hereinbefore set forth, of the axle provided with longitudinally-arranged grooves $b$ and having a shoulder C at the outer ends of said grooves, springs D, applied within the grooves and provided with lugs or catches $d'$ at their free ends, and a washer E, for the purpose described.

6. The combination, substantially as hereinbefore set forth, of the axle provided with a shoulder C, and springs D, having slots and secured to said axle by pins passing through said slots, substantially as described.

MATTHEW LOGSDON.
GEORGE BRAUNS, Jr.

Witnesses:
HENRY C. DAVIS,
WARREN L. MCKIBBEN.